No. 636,117. Patented Oct. 31, 1899.
A. S. COOPER.
APPARATUS FOR RAISING BITUMINOUS SAND FROM WELLS AND SEPARATING BITUMEN FROM ITS INTERSTICES.
(Application filed June 12, 1899.)
(No Model.) 2 Sheets—Sheet 1.
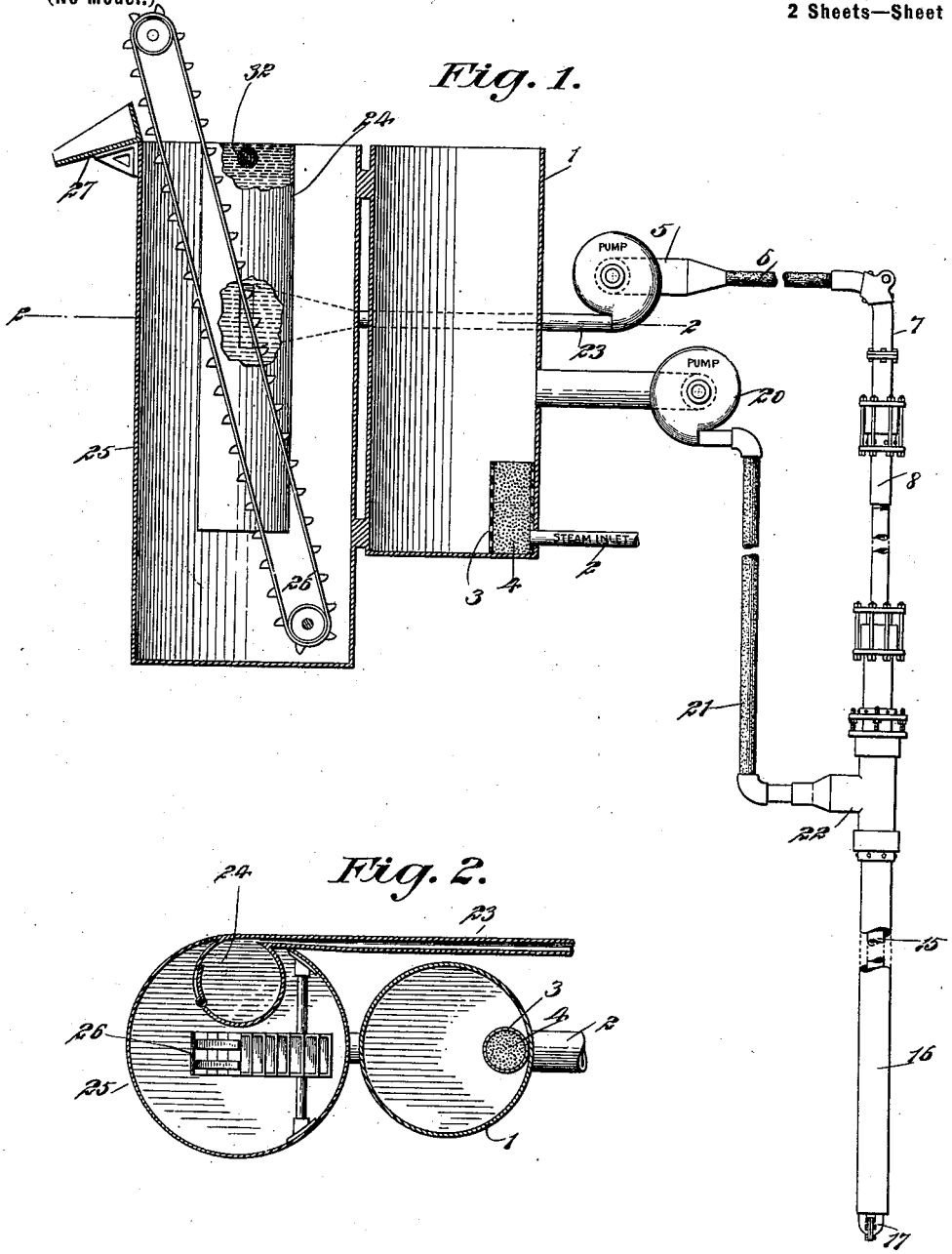

No. 636,117. Patented Oct. 31, 1899.
A. S. COOPER.
APPARATUS FOR RAISING BITUMINOUS SAND FROM WELLS AND SEPARATING BITUMEN FROM ITS INTERSTICES.
(Application filed June 12, 1899.)
(No Model.) 2 Sheets—Sheet 2.
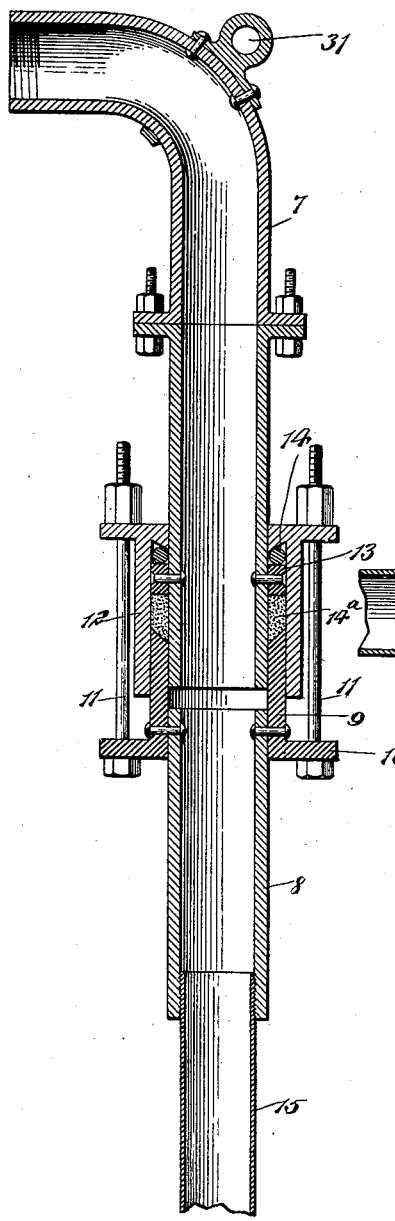
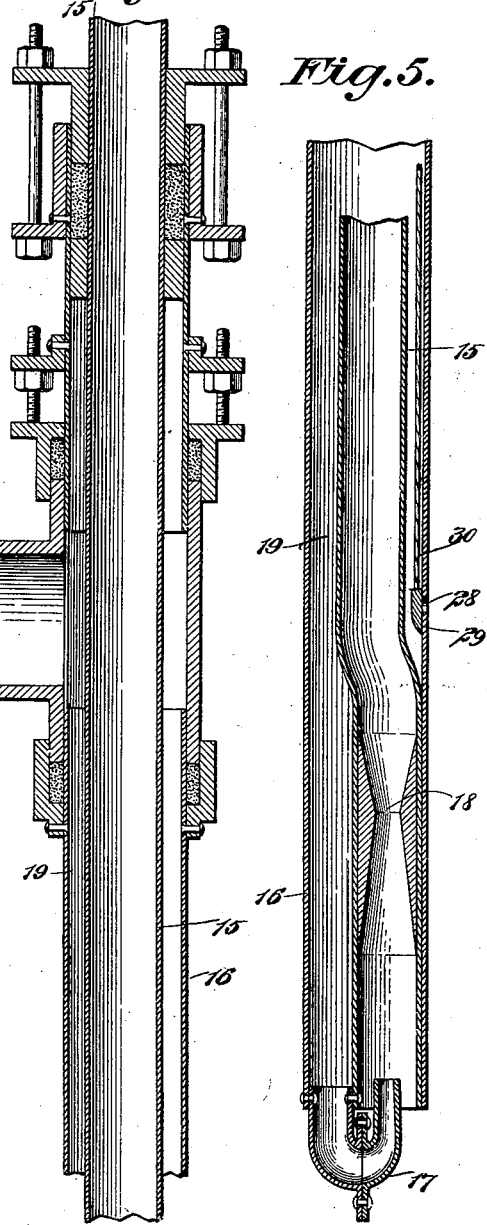
WITNESSES:
INVENTOR
ATTORNEYS

UNITED STATES PATENT OFFICE.

AUGUSTUS STEIGER COOPER, OF SAN FRANCISCO, CALIFORNIA.

APPARATUS FOR RAISING BITUMINOUS SAND FROM WELLS AND SEPARATING BITUMEN FROM ITS IMPURITIES.

SPECIFICATION forming part of Letters Patent No. 636,117, dated October 31, 1899.

Application filed June 12, 1899. Serial No. 720,270. (No model.)

*To all whom it may concern:*

Be it known that I, AUGUSTUS STEIGER COOPER, of San Francisco, in the county of San Francisco and State of California, have invented a new and Improved Apparatus for Raising Bituminous Sand from Wells and Separating the Bitumen from Its Impurities, of which the following is a full, clear, and exact description.

In drilling for oil sands filled with maltha are frequently encountered. The viscosity of the maltha is so great that when the tools and rope used in drilling become quickly coated with it they cannot be operated. Sometimes these sands containing maltha lie on the top of sands which contain a more liquid bitumen, especially where no good natural rock incasement to the oil-sand exists above the bitumen. Generally this maltha is too thick and viscous to pump, and even when it is liquid enough to pump so much fine grit is entangled within its sticky folds that the pumps are soon worn out.

One method employed for removing the material from wells is by using a long pole thickly studded with projecting nails. This pole is lowered into the well by means of a rope and sunk below the surface of the maltha. It is then removed from the well and the maltha permitted to drain from the same into a barrel or other receptacle; but obviously it drains very slowly. In fact, all the methods used for removing the maltha are unsatisfactory and profitless.

The object of my invention, therefore, is to provide a simple means by which the material may be raised from a well and the bitumen readily separated from the impurities; and in carrying out my process I employ hot water, by means of which the sticky bitumen is rendered more liquid, so that it separates from its impurities, the impurities sinking to the bottom of the water in a tank and the bitumen rising and floating on the surface of the water, from which it may be removed by skimming or draining.

I will describe an apparatus for raising bituminous sand from wells and separating the bitumen from its impurities embodying my invention and then point out the novel features in the appended claims.

Reference is to be had to the accompanying drawings, forming a part of this specification, in which similar characters of reference indicate corresponding parts in all the figures.

Figure 1 is a partial side elevation and partial section of an apparatus embodying my invention. Fig. 2 is a section on the line 2 2 of Fig. 1, and Figs. 3, 4, and 5 are longitudinal sectional views of different sections of hydraulic tubes employed.

Referring to the drawings, 1 designates a water-tank, the water in which is to be heated preferably to about 212° Fahrenheit, and as a means for heating the water steam may profitably be employed In fact, the exhaust-steam from an engine will be found all that is necessary. The steam will enter the tank 1 through a pipe 2, the steam first entering a wire-cloth cylinder 3, arranged in the tank 1 and filled with shot, pebbles, or the like 4. This is done to prevent the noise which occurs when steam enters water directly through the end of a pipe. If more heat is required than that furnished by the exhaust-steam, an apparatus such as is used to warm water in bath-houses, laundries, &c., can be employed, or the water contained in the well may be heated by an electric heater.

The centrifugal pump 5 has a flexible tube connection 6 with a pipe-section 7, which is connected to a pipe-section 8 by means of a coupling, here shown as consisting of a sleeve 9, bolted to the pipe-section 8 and having an annular flange 10, from which clamping-bolts 11 pass and through an annular flange on a sleeve 12, surrounding the pipe-section 7 and also engaging around the coupling-section 9. Secured to the pipe-section 7 within the sleeve portion 12 is a ring 13, and to this ring 13 and on the top side of the sleeve 12 is a packing-ring 14, and between said ring 13 and the top of the coupling-section 9 any suitable packing 14ª is placed. By this construction of the joint the section 8 of the pipe and the parts carried thereby may be rotated relatively to the section 7. From the end of the pipe-section 8 a tube 15 extends downward and through a jacket-pipe 16, the space 19 within the jacket-pipe and surrounding the tube 15 being designed for the passage of hot water to the well, and a portion of this hot water will be forced up through the tube 15, carrying the liquefied bitumen or maltha with it, and the sand, by means of an injector 17, arranged at the lower end of the jacket-pipe 16 and having its outward end extended into the lower end of the tube 15, and this tube 15 at a short distance above the injector has a reduced throat portion 18. Water is forced into the space 19 from the tank 1 by means of a centrifugal pump 20, having a flexible tube connection 21 with a nipple 22, communicating with said space 19.

The pump 5 has a pipe connection 23 with a separating bottomless cylinder 24, arranged in a tank 25 for receiving the sand and other impurities. The mouth of the pipe 23 where it enters the cylinder 24 is elongated, so that the material will be somewhat distributed in the cylinder. Arranged to operate in the tank 25 is an endless bucket elevator 26 for carrying sand from said tank 25 and discharging it into a trough 27, leading to any suitable receptacle or dump.

In operation the hot water is forced down the well through the annular space 19 by the centrifugal pump 20. The water passes through the injector 17, a portion of it, however, passing into the well. Water from the injector is forced through the throat 18, carrying by suction from the walls of the well the mixture of water, sand, silt, and bitumen up the tube 15. This upward movement through the tube 15 is assisted by the centrifugal pump 5. The column of water in the tube 15 is counterpoised by the water contained in the space 19 and the water in the well. The force exerted by the centrifugal pumps will be sufficient to overcome the friction in the pipes and furnish a current of water of sufficient velocity to be able to lift the required amount of water, sand, silt, and bitumen to the surface. A packing can be placed between the pipes and the casing of the well, and this will permit of the use of the full power of the centrifugal pump 20 in raising material from the well irrespective of the use of the hydraulic elevator, consisting of the parts 17 and 18.

An opening 28 in the jacket-pipe 19 is normally closed by a sliding valve 29 and which may be operated by a wire rope 30, extended upward to the surface. This opening 28 is designed to admit water into the well which is used for hydraulicking the bituminized sand and assists in moving the same toward the hydraulic elevator 17 18. The pipes and hydraulic elevator may be raised and lowered to the required point in a well by a rope attached to a ring 31 on the pipe 7, the said rope passing over the crown-pulley of a hoisting-derrick. The flexible connections 6 and 21 will permit of these movements without interfering with the pumps 5 and 20.

The mixture of water, sand, silt, and bitumen forced into the cylinder 24 through the pipe 23, which enters the cylinder at a tangent to the circumference, causes the mixture to assume a cyclonic motion, the sand and silt being driven by centrifugal force to the wall of the cylinder and falling through the open bottom of the same, while the maltha, being the lightest material present in the mixture, collects in the center of the cylinder and by its buoyancy in the water rises to the upper part of the cylinder, so that it may be removed through a pipe or opening 22 and discharged into a suitable receptacle, or it may be skimmed off the surface of the water. The sand collecting in the tank 25 is removed by means of the elevator 26, and the water contained in the tank 22 may be removed to the tank 1 to be used again in the manner described.

Having thus fully described my invention, I claim as new and desire to secure by Letters Patent—

1. In an apparatus for raising bituminized sand from wells and separating the bitumen from the impurities, a hot-water tank, a separating-cylinder open at its bottom, a pump having pipe connection with said cylinder, a pipe leading from said pump to a tube designed to extend into the well, a jacket surrounding said tube, another pump having connection with the water-tank and also having communication with the space between the jacket and the tube, and an injector at the lower end of the jacket and tube, substantially as specified.

2. An apparatus for raising bituminized sand from wells and separating the bitumen from its impurities, consisting in a hot-water tank, means for discharging a heating medium into the tank, a sand-receiving tank, an elevator in said sand-receiving tank, a separating-cylinder in the tank and open at its lower end, a pump having pipe connection with the cylinder, a hydraulic pipe having connection with the pump, a jacket surrounding the lower portion of said pipe, a pump having connections for forcing water from the water-tank into the jacket and an injector at the lower end of the jacket and pipe, substantially as specified.

AUGUSTUS STEIGER COOPER.

Witnesses:
VAN WADE JACOBS,
BARTLETT COOPER.